United States Patent [19]
Nakagome

[11] Patent Number: 6,164,792
[45] Date of Patent: Dec. 26, 2000

[54] SOUND RESPONSIVE DECORATIVE ILLUMINATION APPARATUS

[75] Inventor: Masaharu Nakagome, Tokyo, Japan

[73] Assignee: Fujix Co., Ltd., Tokyo, Japan

[21] Appl. No.: 09/332,073

[22] Filed: Jun. 14, 1999

[30] Foreign Application Priority Data

Aug. 4, 1998 [JP] Japan .................................. 10-220143

[51] Int. Cl.⁷ .................................................. B60Q 5/00
[52] U.S. Cl. ............................. 362/86; 362/84; 362/464; 362/489; 362/276; 362/811
[58] Field of Search .................................. 362/276, 802, 362/84, 488, 543, 811, 464, 489, 86

[56] References Cited

U.S. PATENT DOCUMENTS

| | | | |
|---|---|---|---|
| 4,213,115 | 7/1980 | Wetzel | 362/84 |
| 4,305,117 | 12/1981 | Evans | 362/276 |
| 4,355,348 | 10/1982 | Williams | 362/276 |
| 4,358,754 | 11/1982 | Young et al. | 362/811 |
| 5,289,355 | 2/1994 | Cimock | 362/276 |
| 5,485,355 | 1/1996 | Voskoboinik et al. | 362/84 |
| 5,566,384 | 10/1996 | Chien | 362/276 |
| 5,633,538 | 5/1997 | Nickerson | 362/489 |
| 6,030,106 | 2/2000 | Johnson | 362/464 |

FOREIGN PATENT DOCUMENTS 2260041  3/1993  United Kingdom ................... 362/276

*Primary Examiner*—Stephen Husar
*Attorney, Agent, or Firm*—Michael D. Bednarek; Shaw Pittman

[57] ABSTRACT

A decorative illumination apparatus including a light source, a microphone, and a controller that changes the light emission of the light source in response to sounds detected by the microphone. The controller controls the intensity and the flashing of the light source. In the preferred embodiment, the invention is installed in an automobile and the light source is a cable-like electroluminescent light source that can be easily fitted around an automobile component, such as an instrument panel. In addition to the microphone, the invention can also be connected to audio equipment, in which case the controller varies light emission in response to audio signals from the audio equipment.

28 Claims, 3 Drawing Sheets

SOUND RESPONSIVE DECORATIVE ILLUMINATION APPARATUS

BACKGROUND OF THE INVENTION

1. Field of the Invention

The present invention relates to a light emitting apparatus that varies light emission in response to sound and, more particularly, to a sound responsive decorative illumination apparatus for use in an automobile proximate to a dashboard, a console box, a loudspeaker, and a window.

2. Description of the Related Art

Decorative illumination apparatus using electroluminescent light sources are well known in the art. Because electroluminescent light sources emit soft light rays that do not irritate the human eye, the light sources are frequently used in applications that require illumination for long periods of time, e.g., instrument panels and road signs.

Conventional decorative illumination apparatus emit a constant level of electroluminescent light that, while unobjectionable to the human eye, tends to be unexciting. This monotonous emission of light therefore limits an apparatus's ability to produce a pleasing decorative effect.

SUMMARY OF THE INVENTION

The present invention enhances the aesthetic qualities of a decorative illumination apparatus by varying the light emission in response to changes in sound. In the preferred embodiment of the present invention, the decorative illumination apparatus includes a light source, a light source controller (referred to hereinafter as "controller") connected to the light source, and a microphone connected to the controller. The light source is preferably a cable-like electroluminescent light source, but can be any other light source or electroluminescent light source suitable for decorative applications. U.S. Pat. No. 5,485,355, the disclosure of which is herein incorporated by reference, discloses the preferred embodiments of the electroluminescent light sources. In response to a level of the output signal from the microphone, the controller controls the light emission from the light source to produce flashing or changes in intensity.

In a preferred embodiment, the present invention is installed in an automobile, with the cable-like electroluminescent light source strung around a component of the car, e.g., along the periphery of the instrument panel. The controller connects both to the light source and the microphone, and is powered by some auxiliary power source, e.g., the automobile power outlet. As the microphone receives varying sound levels from inside and outside the car, the controller responds by changing the light emission from the light source, e.g., brightening, darkening, or flashing. Therefore, as the car is driven, the occupants enjoy a pleasing, unobtrusive visual display with interesting changes in light.

In another embodiment of the present invention, the controller controls the manner of the light emission of the light source in response to the frequency of the output signal of the microphone.

In another embodiment of the present invention, the decorative illumination apparatus connects to an audio output circuit such as a cassette player or a CD player instead of using a microphone. In this embodiment, the controller varies light emission in response to the output level or frequency (audio quality) of the audio output circuit. Thus, when the audio output circuit is in operation, the user enjoys a decorative display of light coordinated with the sound or music.

In another embodiment of the present invention, the decorative illumination apparatus includes a microphone, a connection to an audio output circuit, and a switching means for connecting either the audio output circuit or the microphone to the controller. By operating the switching means, a user directs the controller to vary light emission in response to either the state of the output of the audio output circuit or the level of the output signal of the microphone.

Accordingly, it is an object of the present invention to provide a light emitting apparatus with enhanced decorative qualities.

It is another object of the present invention to provide a decorative illumination apparatus that responds to changes in sound by varying light emission.

These and other objects of the present invention are described in greater detail in the detailed description of the invention, the appended drawings and the attached claims.

DESCRIPTION OF THE PREFERRED EMBODIMENTS

Figure 1:
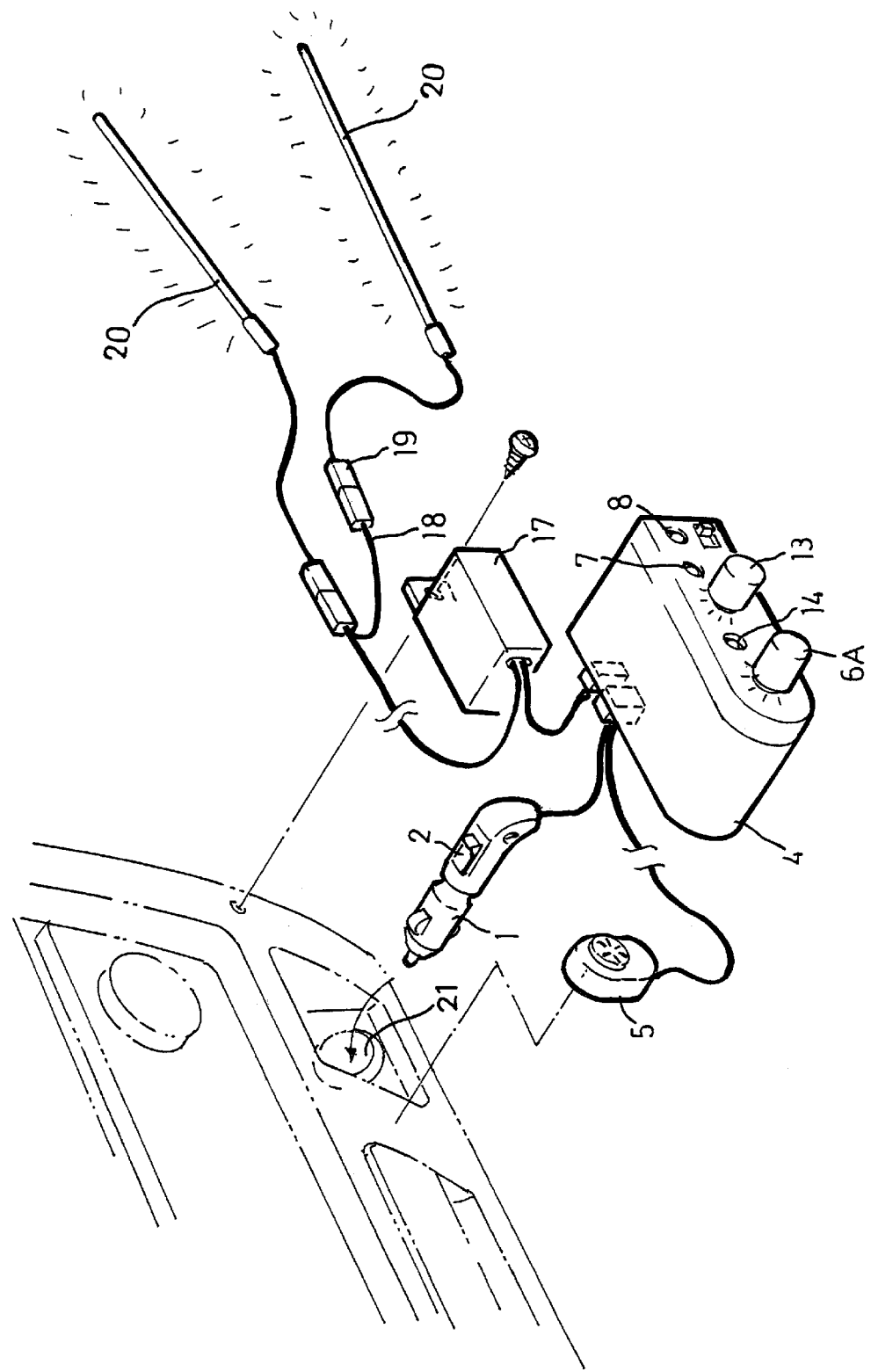
FIG. 1 is a schematic diagram of a decorative illumination apparatus of one embodiment of the present invention.

Referring to FIG. 1, the preferred embodiment of the present invention comprises a controller 4, a microphone 5, a light source 20, a car plug 1, and an inverter 17. The Controller 4 connects directly to the car plug 1 and the microphone 5, and connects to the light source 20 through the inverter 17. The car plug 1 has an integral power switch 2 and connects to a power jack 21 of the car to power the controller 4. The power jack 21 connects to a car battery 3 (shown on FIG. 2) for a power source. The controller 4 connects to the microphone 5, which detects sounds in and around the car, such as conversation, music, and noise (collectively referred to as sound).

The controller 4 also connects to the inverter 17. The inverter 17 inverts the signal from the controller 4 into an alternating current voltage, e.g., a voltage of 130–140 VAC. The inverter 17 connects via output leads 18 and a connector 19 to the light source 20. In the preferred embodiment, the light source 20 is a cable-like electroluminescent light source that can be flexibly bent to fit different configurations. However, the light source 20 could be any other electroluminescent light source or other light source, provided it is suitable for decorative illumination. The light source 20 is installed on a component of the car, e.g., the dashboard or instrument panel.

Figure 2:
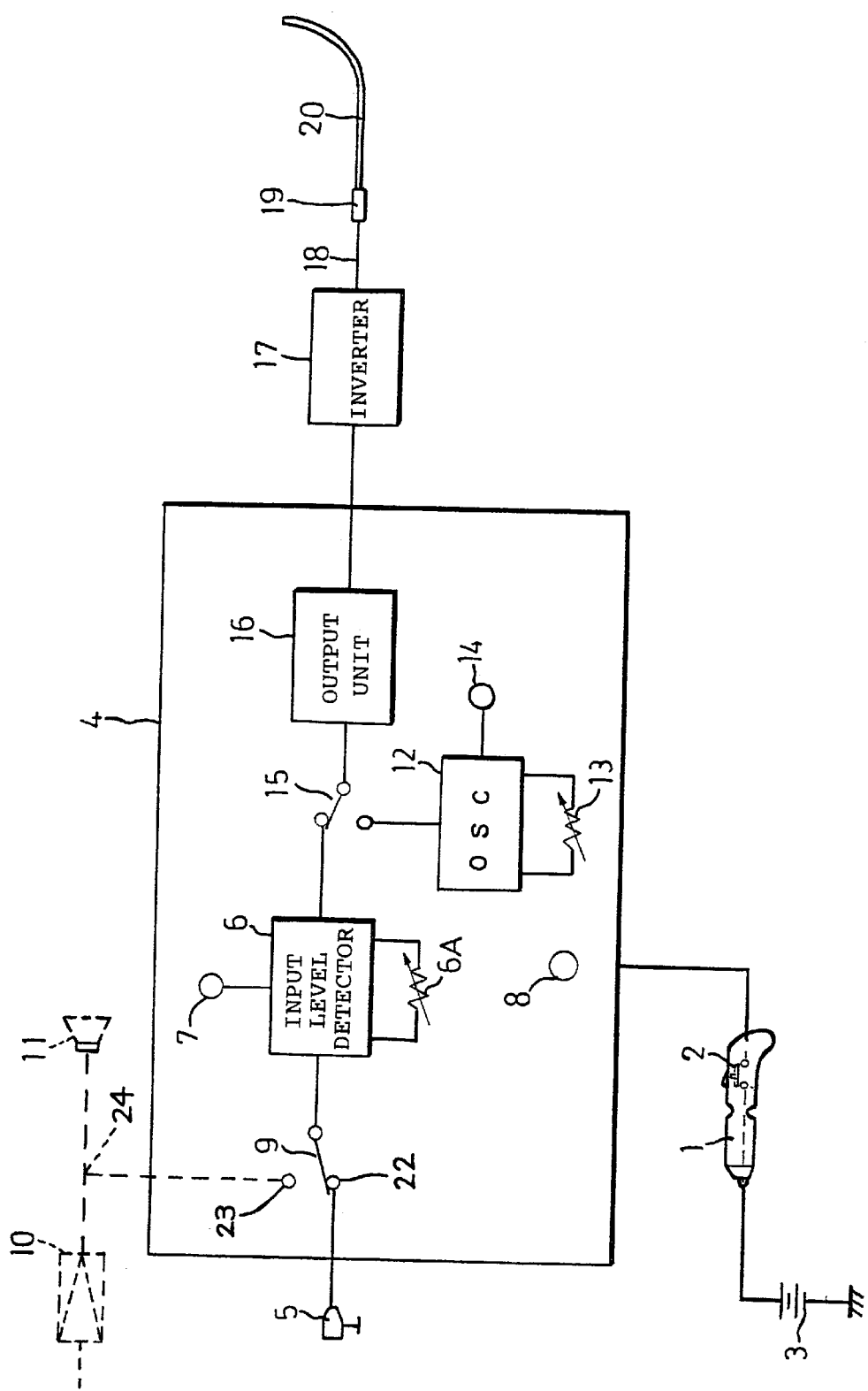
FIG. 2 is a block diagram of the decorative illumination apparatus shown in FIG. 1.

Referring now to FIG. 2, the main internal components of the controller 4 include an input level detector 6, an output unit 16, a variable-frequency oscillator 12, an output changeover switch 15, and a power lamp 8. The input level detector 6 connects on one side to the microphone 5 through a microphone terminal 22 and on the other side to the throw side of the changeover switch 15. Also connected to the throw side of the changeover switch 15 is the variable-frequency oscillator 12. On its fixed side, the changeover switch 15 connects to the output unit 16. Thus, the changeover switch 15 allows a user to choose an output signal to the output unit 16 from either the input level detector 6 or the variable-frequency oscillator 12. The output unit 16 connects to the inverter 17, which is external to the controller 4.

The input level detector 6 detects the level of sound received by the microphone 5 and includes a gain control 6A for adjusting the gain of the input level detector 6.

The variable-frequency oscillator 12 is provided with a variable resistor as a frequency adjuster 13 for adjusting the oscillation frequency. With the frequency adjuster 13, a user sets the frequency with which the light source 20 flashes.

The controller 4 also includes status lamps to indicate operation of the internal components. A first indicator lamp 7 connects to the input level detector 6 and flashes in response to an audio signal from the microphone 5 that rises above a set threshold level. A second indicator lamp 14 connects to the variable-frequency oscillator 12 and flashes on and off corresponding to the oscillation frequency. The power lamp 8 connects to the incoming power source and lights when the power switch 2 is turned on and power is supplied to the controller 4. The first indicator lamp 7, the second indicator lamp 14, and the power lamp 8 comprise any suitable light source, e.g., a light emitting diode.

In the preferred embodiment of the present invention, the controller 4 includes an input changeover switch 9, as shown in FIG. 2., for selecting the source of the signal delivered to the input level detector 6. By operating the changeover switch 9, the input level detector 6 is connected to either the microphone terminal 22 or an audio equipment terminal 23. Thus, the input level detector 6 receives a signal from either the microphone 5 or audio equipment connected to the audio equipment terminal 23. As shown by the dotted lines in FIG. 2, the audio equipment terminal 23 preferably connects to a junction 24 between an output amplifier 10 and a loudspeaker 11. Examples of the audio equipment include but are not limited to a radio, an audio cassette player, a compact disc player, and a mini-disc player.

The present invention operates as follows. With the car plug 1 inserted into the power jack 21, the power switch 2 is turned on and direct current power flows from the battery power source 3 to the circuitry (not shown) in the controller 4. With the controller 4 powered, the input level detector 6, the variable-frequency oscillator 12, and the output unit 16 start operating.

When a user operates the input changeover switch 9 to connect the input level detector 6 to the microphone 5 and operates the output changeover switch 15 to connect the input level detector 6 to the output unit 16, the input level detector 6 measures the level of the sound detected by the microphone 5. The signal corresponding to the level is fed to the inverter 17 via the output unit 16. The inverter 17 inverts the signal from the output unit 16 into an alternating current signal, which is then transmitted to the light source 20 via the output leads 18 and the connector 19. The alternating current signal output to the light source 20 instantaneously varies in response to the output level or frequency of the input level detector 6. Correspondingly, the light emitted from light source varies instantaneously, e.g., the light level or the frequency of the flashing changes. The end result is an aesthetically pleasing light display synchronized with sounds heard in and around the car.

When a user operates the input changeover switch 9 to connect the output amplifier 10 of the audio equipment to the input level detector 6, the controller 4 controls the intensity and flashing frequency of the light source 20 in response to the sound produced by the audio equipment.

The above two input changeover switch scenarios require that the output changeover switch 15 be set to connect the input level detector 6 to the output unit 16. However, a user also has the option of setting the output changeover switch 15 to connect the variable-frequency oscillator 12 to the output unit 16. In such a case, the signal supplied to the output unit 16 depends on the setting of the frequency adjuster 13. The frequency adjuster 13 controls the frequency with which an output signal is generated and in turn, the frequency with which the light source 20 flashes.

Figure 3:
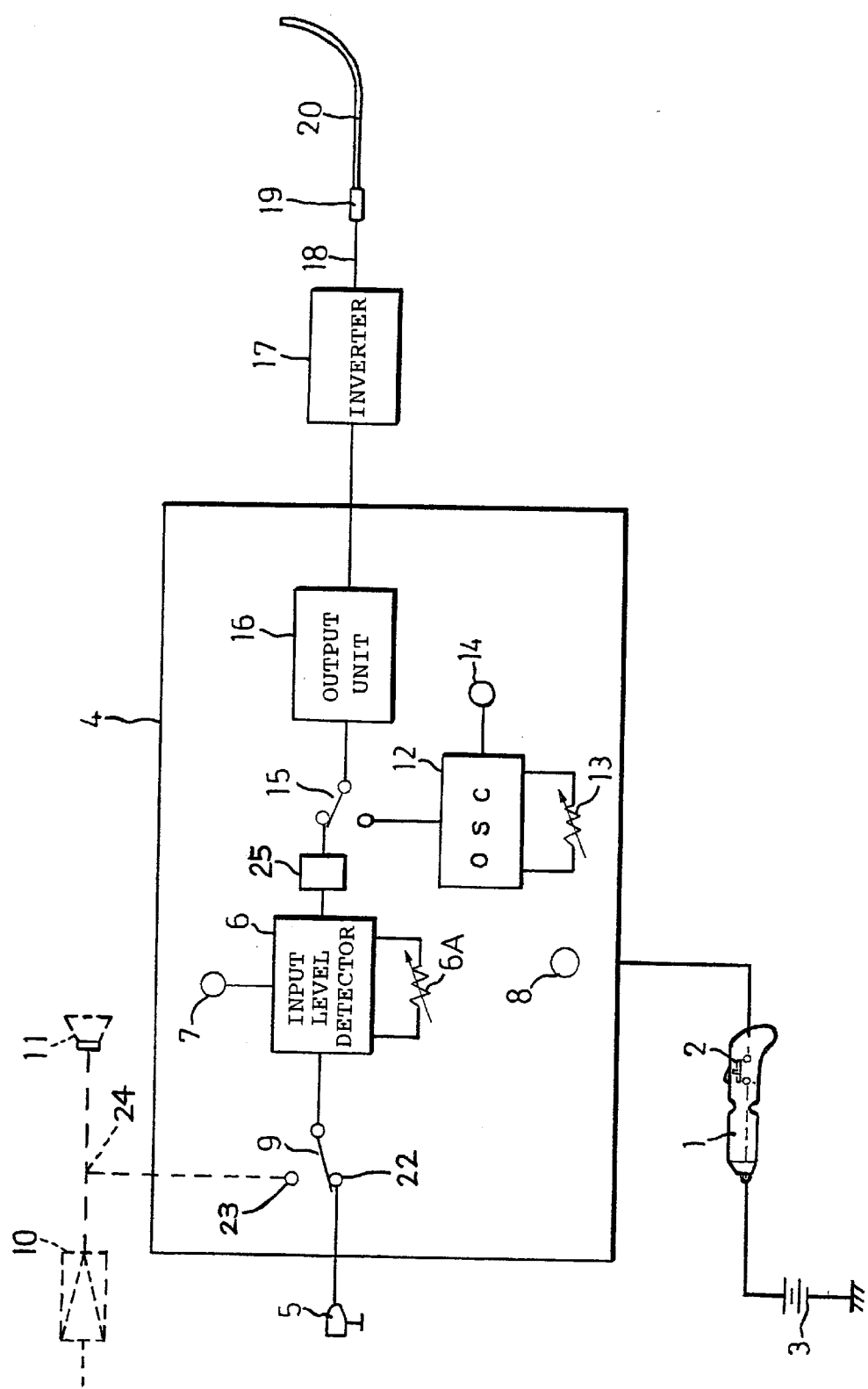
FIG. 3 is the block diagram of FIG. 2 with a frequency detection filter added.

FIG. 3 shows a further embodiment of the present invention, comprising the addition of a frequency detecting filter 25, e.g., a low-pass filter, a band-pass filter, or a high-pass filter. In this configuration, the frequency detecting filter 25 permits only audio signals of a particular frequency to pass through to the output unit 16 and the inverter 17, whether the signals originate from the microphone 5 or the output amplifier 10. Therefore, the illumination or flashing of the light source 20 can be synchronized with the timing of a particular audio quality (a signal of a particular frequency) received from the microphone 5 or the output amplifier 10.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A light emitting apparatus comprising:
   (a) a controller;
   (b) an audio signal source connected to the controller, said audio signal source detecting sound signals and transmitting to the controller output signals proportional to the sound signals;
   (c) a light source connected to the controller, wherein the controller varies a light emission property of the light source in response to the output signals; and
   (d) the controller connected to a car plug adapted to mate with a power jack to deliver power to the controller.

2. The light emitting apparatus of claim 1, wherein the light emitting apparatus is installed in a car and the controller is powered by a connection to a power source of the car.

3. The light emitting apparatus of claim 2, wherein the light source is fitted around a component of the car.

4. The light emitting apparatus of claim 3, wherein the light source is a cable-like electroluminescent light source.

5. The light emitting apparatus of claim 1, wherein the light source is an electroluminescent light source.

6. The light emitting apparatus of claim 1, wherein the light source is a cable-like electroluminescent light source.

7. The light emitting apparatus of claim 1, wherein the light emission property is the intensity of the light source.

8. The light emitting apparatus of claim 1, wherein the light emission property is a flashing of the light source.

9. The light emitting apparatus of claim 1, wherein the controller varies the light emission property in response to frequencies of the output signals.

10. The light emitting apparatus of claim 1, wherein an inverter connects the controller to the light source, said converter supplying a drive voltage to the light source.

11. The light emitting apparatus of claim 1, wherein the controller includes a filter that allows only an output signal having a particular frequency to pass through to the light source.

12. The light emitting apparatus of claim 1, wherein the audio signal source is a microphone.

13. The light emitting apparatus of claim 1, wherein the audio signal source is an audio output circuit.

14. The light emitting apparatus of claim 1, further comprising:
   (d) a microphone connected to the controller;
   (e) an audio output circuit connected to the controller;
   (f) an input switch for terminating the controller to either the audio output circuit or the microphone, such that the output signals are received by the controller from either the audio output circuit or the microphone.

15. The light emitting apparatus of claim 1, wherein the controller comprises:
   (i) an input level detector connected to the audio signal source and to an output switch; and
   (ii) a variable-frequency oscillator connected to the output switch,
       wherein the output switch terminates either the input level detector or the variable-frequency oscillator to the light source to vary the light emission property of the light source.

16. A decorative illumination apparatus comprising:
   (a) a cable-like electroluminescent light source;
   (b) an audio signal source;
   (c) a controller connected to the cable-like electroluminescent light source and to the audio signal source, wherein the controller controls a manner of light emission of the electroluminescent light source as a function of an output signal from the audio signal source;
   (d) the controller connected to a car plug adapted to mate with a power jack to deliver power to the controller; and
   (e) an inverter separate from the controller, the controller adapted to be located at a first location and the inverter communicating with the controller and adapted to be attached to a dashboard at a second location different than the first location.

17. The decorative illumination apparatus of claim 16, wherein the manner of light emission is light level of the electroluminescent light source.

18. The decorative illumination apparatus of claim 16, wherein the manner of light emission is flashing of the electroluminescent light source.

19. The decorative illumination apparatus of claim 16, wherein the controller controls a manner of light emission of the electroluminescent light source as a function of a level of the output signal.

20. The decorative illumination apparatus of claim 16, wherein the controller controls a manner of light emission of the electroluminescent light source as a function of a frequency of the output signal.

21. The decorative illumination apparatus of claim 16, wherein the controller comprises a filter that allows only an output signal having a particular frequency to pass through to the electroluminescent light source.

22. The decorative illumination apparatus of claim 16, further comprising:
   (d) a plurality of audio signal sources; and
   (e) a switching means for terminating a single audio signal source of the plurality of audio signal sources to the controller.

23. The decorative illumination apparatus of claim 22, wherein the plurality of audio signal sources comprise a microphone and an audio output circuit.

24. A decorative illumination apparatus comprising:
   (a) a light source;
   (b) an audio output circuit;
   (c) a controller connected to the light source and the audio output circuit, wherein the controller controls a manner of light emission of the light source as a function of an output state of the audio output circuit; and
   (d) the controller connected to a car plug including an integrated power switch and adapted to mate with a power jack to deliver power to the controller.

25. The decorative illumination apparatus of claim 24, wherein the controller controls light emission level of the light source.

26. The decorative illumination apparatus of claim 24, wherein the controller controls flashing of the light source.

27. The decorative illumination apparatus of claim 24, wherein the controller comprises a filter that allows only an output signal having a particular frequency to pass through to the light source.

28. The decorative illumination apparatus of claim 24, further comprising:
   (d) a microphone connected to the controller;
   (e) a switching means for terminating either the audio output circuit or the microphone to the controller, such that the controller controls the manner of light emission of the light source as a function of either the output state of the audio output circuit or a level of an output signal from the microphone.

* * * * *